United States Patent [19]
Hoya

[11] Patent Number: 5,497,862
[45] Date of Patent: Mar. 12, 1996

[54] HYDRAULIC SHOCK ABSORBER HAVING VARIABLE DAMPING FORCE CHARACTERISTIC STRUCTURE

[75] Inventor: Hiroshi Hoya, Atsugi, Japan

[73] Assignee: Unisia Jecs Corporation, Atsugi, Japan

[21] Appl. No.: 391,683

[22] Filed: Feb. 21, 1995

[30] Foreign Application Priority Data

Feb. 22, 1994 [JP] Japan .................... 6-024122

[51] Int. Cl.$^6$ ........................................ F16F 9/50
[52] U.S. Cl. .................... 188/282; 188/319; 188/322.15; 280/714
[58] Field of Search ................. 188/281, 282, 188/299, 311, 313, 314, 316, 317, 319, 322.14, 322.15; 280/707, 714

[56] References Cited

U.S. PATENT DOCUMENTS

| | | | |
|---|---|---|---|
| 4,826,207 | 5/1989 | Yoshioka et al. | 280/714 |
| 5,307,907 | 5/1994 | Nakamura et al. | 188/282 |
| 5,404,973 | 4/1995 | Katoh et al. | 188/319 |

FOREIGN PATENT DOCUMENTS

| | | |
|---|---|---|
| 0545687 | 6/1993 | European Pat. Off. . |
| 4407754 | 9/1994 | Germany . |
| 62-130241 | 8/1987 | Japan . |
| 2233064 | 1/1991 | United Kingdom . |
| 2236574 | 4/1991 | United Kingdom . |
| 2262794 | 6/1993 | United Kingdom . |

OTHER PUBLICATIONS

Patent Abstracts of Japan, vol. 12, No. 131 (M–688), JP 62-253507, Nov. 1987.

*Primary Examiner*—Robert J. Oberleitner
*Assistant Examiner*—Lee W. Young
*Attorney, Agent, or Firm*—Foley & Lardner

[57] ABSTRACT

In a hydraulic shock absorber having a variable damping force characteristic structure, at least one extension phase one-way passageway and one compression phase one-way passageway are formed in a piston body so as to allow a fluid flow to be communicated between a first chamber and a second chamber in the extension and compression phases, respectively, and a grooved control rod forms a control valve element rotatably disposed in a hollow rod extended in a cylinder containing damping fluid. Extension and compression phase throttles are formed in the extension and compression phase one-way passageways by ports radially penetrated through a side wall of the hollow rod and the grooved control rod whose fluid cross sectional areas are varied according to a rotated position of the grooved control rod. In addition, four disc-shaped damping valves are formed in an interior of the cylinder.

10 Claims, 6 Drawing Sheets

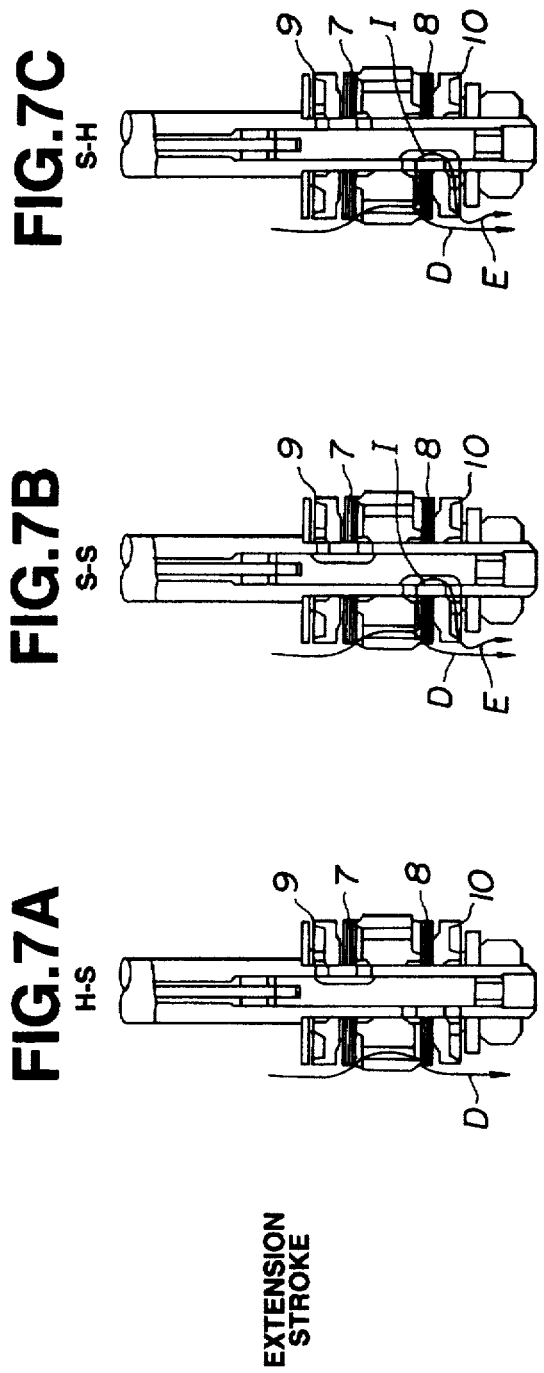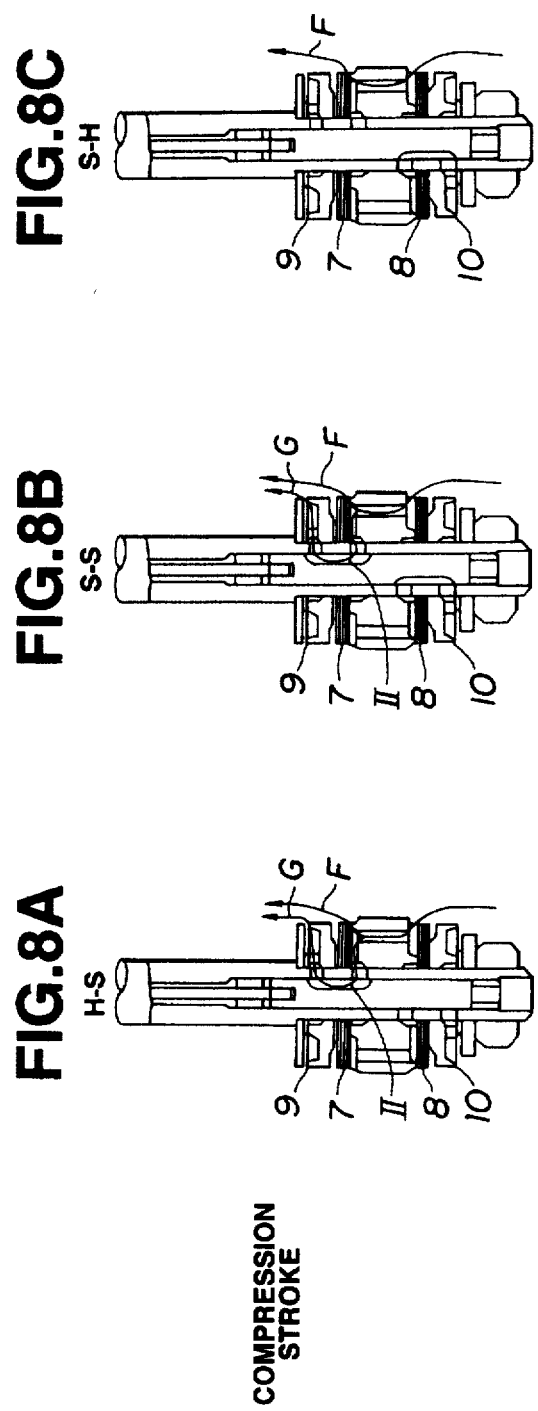

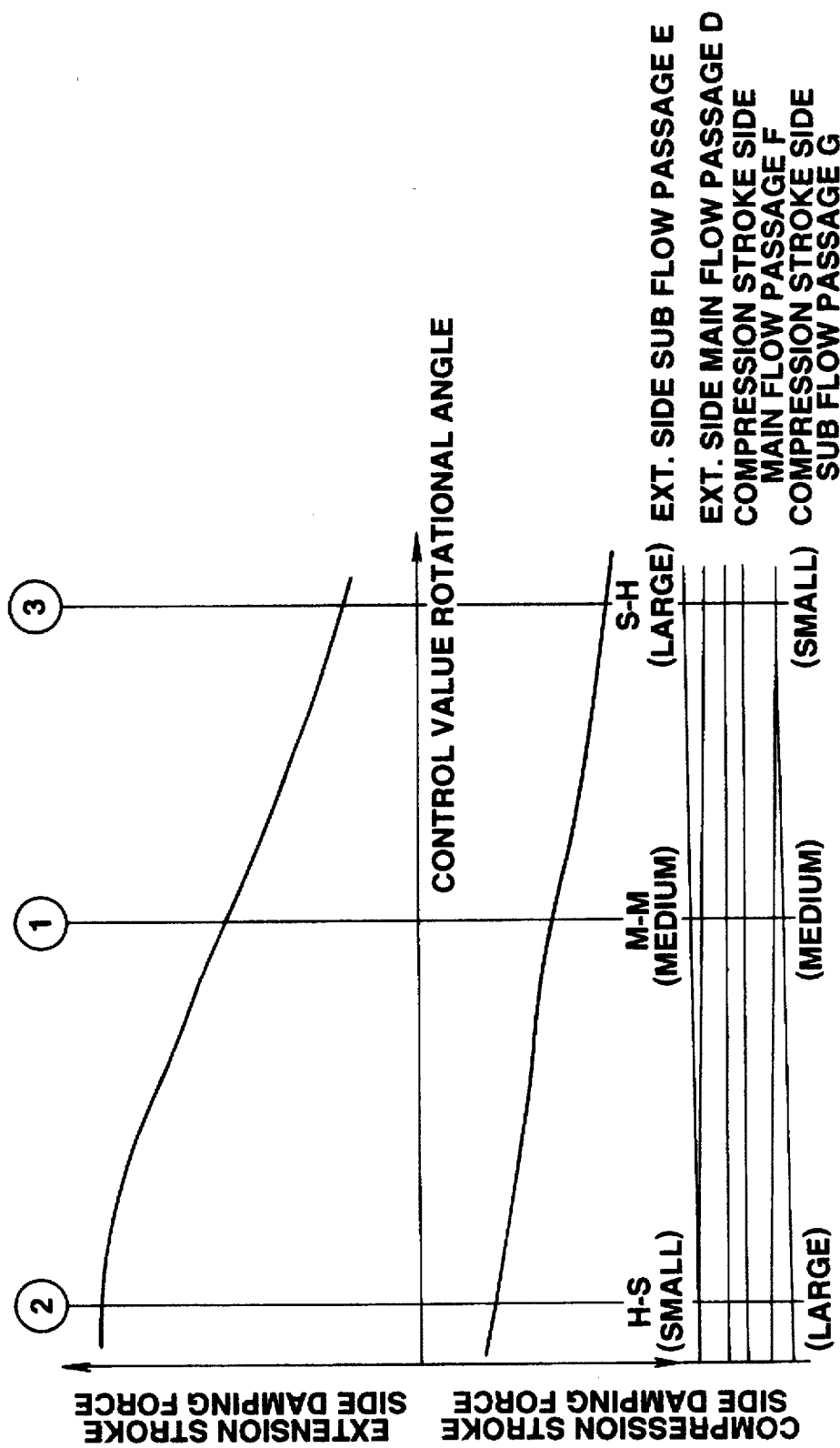

HYDRAULIC SHOCK ABSORBER HAVING VARIABLE DAMPING FORCE CHARACTERISTIC STRUCTURE

BACKGROUND OF THE INVENTION

1. Field of The Invention

The present invention relates to a hydraulic shock absorber having a variable damping force characteristic structure and which is applicable to a vehicular suspension system. The present invention particularly relates to the hydraulic shock absorber in which the damping force characteristics at extension and compression (also called contraction) phases can be varied independently of each other.

2. Description of Background Art

A Japanese Utility Model (Registration) Application First Publication No. Showa 62-130241 exemplifies a first previously proposed hydraulic shock absorber in which both damping force characteristics at extension and compression phases are varied according to a rotational displacement position of a control valve element.

In the first previously proposed shock absorber, a control valve element (adjuster) is provided with an extension phase one-way check valve which is so constructed and arranged as to block a fluid flow from an extension/compression phase common bypass flow passage to an extension phase incoming flow passage direction and a compression phase one-way check valve is installed in a compression phase incoming flow passage so as to block the fluid flow from the extension/compression common bypass passage into a lower chamber. That is to say, the extension and compression phase one-way check valves are incorporated into an interior of a cylinder of the shock absorber so that an axial center bore of a piston rod is used as a common bypass passage at an extension phase (stroke) and compression phase.

Since, however, the axial center bore formed at an axial center portion of the piston rod is used as the extension/compression phase common bypass flow passage so that the flow passage and extension phase one-way check valve are disposed within the control valve element, an outer diameter of the control valve element cannot be smaller. Thus, the following problems occur:

(1) It is necessary to highly accurately finish a clearance between the outer diameter portion of the control valve element and an inner diameter portion of the piston rod in order to decrease deviations in the damping forces due to fluid leakage thereat. Thus, a cost of manufacturing the first previously proposed hydraulic shock absorber becomes accordingly high.

(2) Since the outer diameter of the control valve element is restricted, an outer diameter of a stud portion of the piston rod is accordingly restricted. Thus, depending upon a dimension in the piston rod, it becomes necessary to newly add the stud portion to the piston road as a separate part. Consequently, the cost of manufacturing the first previously proposed shock absorber becomes accordingly high.

(3) Since the outer diameter of the stud portion of the piston rod is restricted, a ratio of an outer diameter to an inner diameter of each of extension and compression phase high damping valves is accordingly restricted. Thus, a degree of freedom in tuning the damping force characteristics is restricted.

(4) Since the extension phase one-way check valve is needed to be disposed in the control valve element and the compression phase one-way check valve is needed to be disposed in the compression phase fluid incoming flow passage, the structure of the first previously proposed hydraulic shock absorber becomes complex and the cost thereof becomes accordingly high.

A U.S. Pat. No. 5,307,907 issued on May 3, 1994 exemplifies a second previously proposed hydraulic shock absorber.

In the second previously proposed hydraulic shock absorber, a hollow control rod has a central bore opening to a lower chamber and which communicates an upper chamber through axial slots, bypass bores, an angular passage, and radial passages. Since the central bore provides the extension/compression phase common flow passage D, the same problem of the restriction on the outer diameter of the control valve element occurs. Thus, the problems described above in the case of the first previously proposed hydraulic shock absorber are applied equally to those in the case of the second previously proposed hydraulic shock absorber.

SUMMARY OF THE INVENTION

It is therefore an object of the present invention to provide an improved hydraulic shock absorber having a variable damping force characteristic structure which can have a control valve element of a smaller outer diameter, which can be simplified in its structure, which can increase a degree of freedom in tuning damping force characteristics, which can achieve a cost reduction, and in which a switching between a damping force characteristic position at which an extension phase is in a mode of a soft damping force characteristic, a compression phase being in a mode of a hard damping force characteristic and another damping force characteristic position at which the extension phase is in the mode of the hard damping force characteristic, the compression phase being in the mode of the soft damping force characteristic is possible.

The above-described object can be achieved by providing a hydraulic shock absorber having a variable damping force characteristic structure, comprising: a) an outer cylinder; b) a hollow rod; c) a piston which is so constructed and secured on an outer periphery of said hollow rod so as to divide an interior of said cylinder into first and second chambers containing damping fluid and as to slidably move axially of said cylinder in accordance with a road condition, said piston having a piston body member along an axial direction of which extension phase fluid communication hole means and compression phase fluid communication hole means are penetrated for communicating fluid flow between said first and second chambers and said piston body member forming at least both of an extension phase intermediate pressure receiving chamber around an outlet of said extension phase fluid communication hole means and of a compression phase intermediate pressure receiving chamber on an outlet of said compression phase fluid communication hole means; d) first extension phase disc-shaped damping valve means for restrictively allowing the fluid flow into said second chamber via said extension phase fluid communication hole means and extension phase intermediate pressure receiving chamber so as to generate a relatively high damping force thereat; e) first compression phase disc-shaped damping valve means for restrictively allowing the fluid flow into said first chamber via said compression phase fluid communication hole means and compression phase intermediate pressure receiving chamber so as to generate the relatively high damping force thereat; f) a control valve element which is rotatably disposed within said hollow rod and having first and second groove means formed on different positions in an axial direction of said control valve element; g) at least first, second, third, and fourth radial holes penetrated through an outer wall of said hollow rod radially of said hollow rod; h) second extension phase disc-shaped damping valve means for restrictively allowing the fluid flow into said second chamber via said extension phase fluid communication hole means, extension phase intermediate pressure receiving chamber, first and second radial holes, and first groove means so as to generate a relatively low damping force thereat; i) second compression phase disc-shaped damping force valve means for restrictively allowing the fluid flow into said first chamber via said compression phase fluid communication hole means, compression phase intermediate pressure receiving chamber, third and fourth radial holes, and second groove means so as to generate the relatively low damping force thereat; j) an extension phase one-way passageway bypassing said first extension phase disc-shaped damping valve means, being formed of said extension phase fluid communication hole means, first and second radial holes, and first groove means, and having extension phase variable throttle means formed by said first and second radial holes and by said first groove means and whose flow cross sectional area is varied according to a rotationally displaced position of said control valve element; and k) a compression phase one-way passageway bypassing said first compression phase disc-shaped damping valve means, being formed of said compression phase fluid communication hole means, third and fourth radial holes, and second groove means, and having compression phase variable throttle means formed by said third and fourth radial holes and by said second groove means and whose flow cross sectional area is varied according to the rotationally displaced position of said control valve element; and wherein said control valve element is in a shape of grooved rod extended axially in said hollow rod and has a neutral position at which both extension and compression phase one-way passageways are open, both extension and compression phase throttle means taking their large cross sectional areas, said control valve element being angularly displaceable in a first rotational direction from said neutral position to a first displaced position at which a throttle opening of said extension phase throttle means indicates a relatively large, another throttle opening of said compression phase throttle means indicating a relatively small so as to limit the fluid flow therethrough and being angularly displaceable in a second rotational direction opposite to the first rotational direction from the neutral position to a second displaced position at which the throttle opening of said extension phase throttle means indicates the relatively small so as to limit the fluid flow therethrough, the other throttle opening of said compression phase throttle means indicating the relatively large.

BRIEF DESCRIPTION OF THE DRAWINGS

FIGS. 7A, 7B, and 7C are explanatory views of the hydraulic shock absorber for explaining fluid flows in an extension phase (stroke) when the control valve element is rotatably displaced at H-S, S-S, and S-H damping force characteristic positions, respectively.

FIGS. 8A, 8B, and 8C are explanatory views of the hydraulic shock absorber for explaining fluid flows in a compression phase (stroke) when the control valve element is rotatably displaced at H-S, S-S, and S-H damping force characteristic positions, respectively.

FIG. 10 is another damping force characteristic varying graph in another embodiment and throttle opening states in each of flow passages in the other embodiment.

BEST MODE CARRYING OUT THE INVENTION

Reference will hereinafter be made to the drawings in order to facilitate a better understanding of the present invention.

Figure 1:
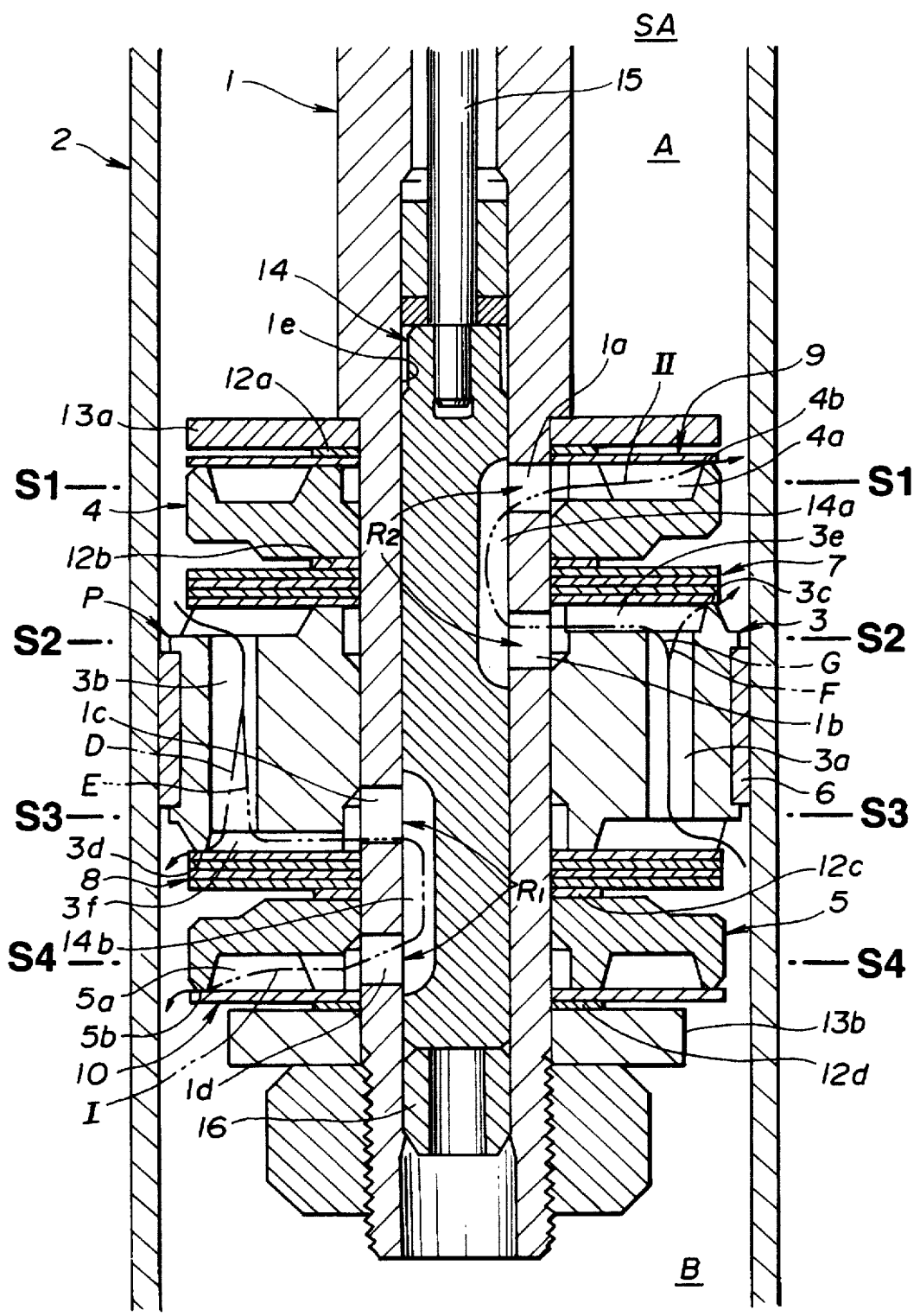
FIG. 1 is a longitudinal cross sectional view of an essential part of a hydraulic shock absorber having a variable damping force characteristic structure in a preferred embodiment according to the present invention.

FIG. 1 shows a cross sectional view of a hydraulic shock absorber SA in a preferred embodiment according to the present invention, particularly indicating an extension phase one-way passageway and a compression phase one-way passageway.

As shown in FIG. 1, the hydraulic shock absorber (also called, damper but herein referred to as a shock absorber) includes a piston P which is slidably movable along an axial direction of a cylinder 2 and is secured on an outer periphery of a tip of a piston rod 1. The piston rod 1 is also called a hollow rod. The piston P serves to divide the interior of the cylinder 2 into an upper chamber A and lower chamber B containing damping fluid.

The piston P includes: a piston body member 3; and an extension phase sub body 5 and compression (contraction) phase sub body 4, both sub bodies 4 and 5 being serially-conneted form and interposed on upper and lower ends of the piston body 3.

A piston ring 6 is attached onto an outer peripheral surface of the piston body 3 so that the piston body 3 is slidably sealed against the axial surface of the interior of the cylinder 2.

Figure 2:
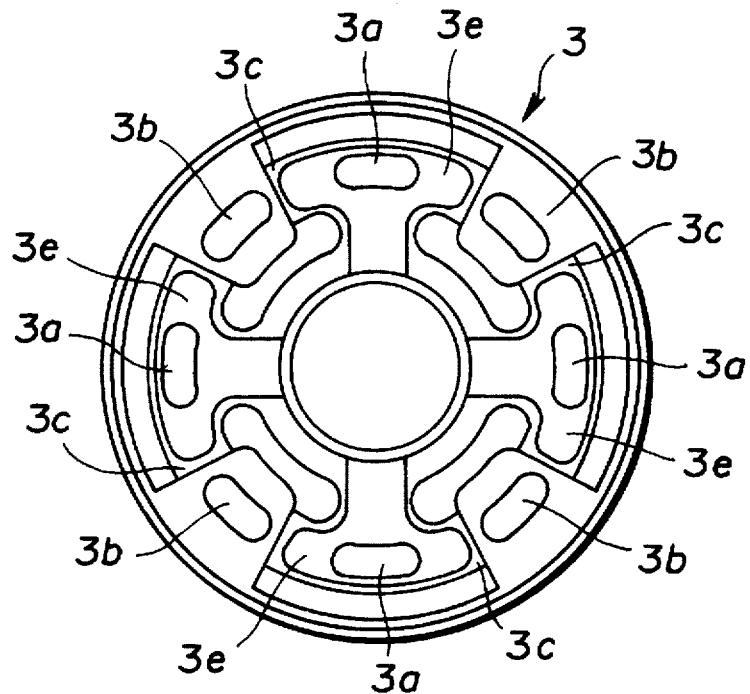
FIG. 2 is a top view of a piston body shown in FIG. 1.
Figure 3:
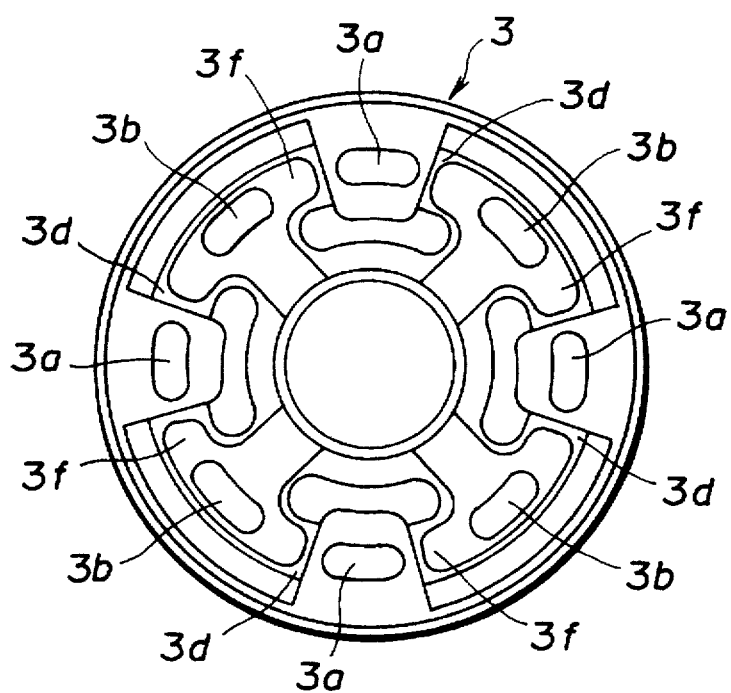
FIG. 3 is a bottom view of the piston body shown in FIG. 1.
Figures 4A, 4B, 4C, 4D:
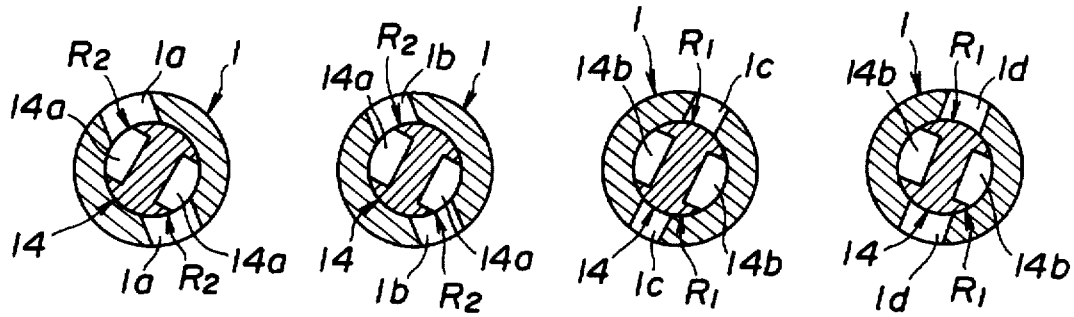
FIGS. 4A, 4B, 4C, and 4D are cross sectional views cut way along lines S1—S1, S2—S2, S3—S3, and S4—S4 of FIG. 1, respectively, when a control valve element shown in FIG. 1 is rotated and rested in a H-S damping force characteristic position.
Figures 5A, 5B, 5C, 5D:
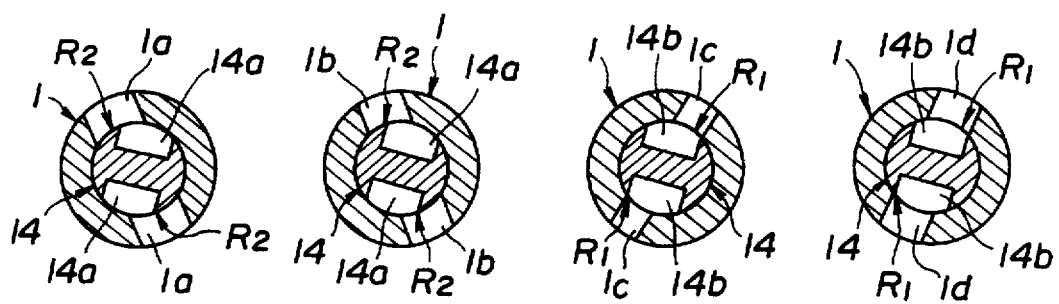
FIGS. 5A, 5B, 5C, and 5D are cross sectional views cut way along lines S1—S1, S2—S2, S3—S3, and S4—S4 of FIG. 1, respectively, when the control valve element shown in FIG. 1 is rotated and stopped in a S-S damping force characteristic position.
Figures 6A, 6B, 6C, 6D:
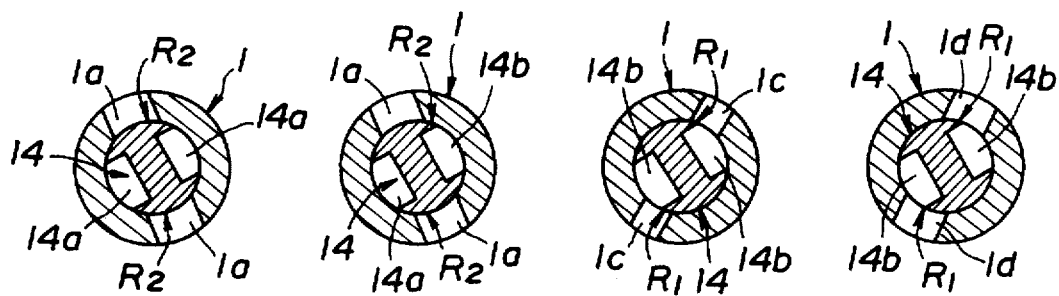
FIGS. 6A, 6B, 6C, and 6D are cross sectional views cut along lines S1—S1, S2—S2, S3—S3, and S4—S4 of FIG. 1, respectively, when the control valve element shown in FIG. 1 is rotated in a S-H damping force characteristic position.

FIGS. 2 and 3 show top view and bottom view of the piston body member 3.

As shown in FIGS. 1 through 3, the piston body member includes: four compression phase communication holes 3a, 3a, 3a, 3a which are penetrated axially of the piston body member 3 and serve to secure fluid flow from the lower chamber B to the upper chamber A; and four extension phase communication holes 3b, 3b, 3b, 3b which are penetrated axially of the piston body member 3 and serve to secure fluid flow from the upper chamber A to the lower chamber B, both extension and compression phase communication holes 3a and 3b being alternatingly arranged with respect to a radial direction of the piston body member. In addition, an upper surface of the piston body member 3 has compression phase seat (land) surfaces projected therefrom to form compression phase intermediate pressure receiving chambers 3e communicated with the compression phase communication holes 3a. On the contrary, a bottom surface of the piston body member 3 has extension phase seat surfaces projected therefrom to form extension phase intermediate pressure receiving chambers 3f communicated with the extension phase communication holes 3b.

Furthermore, a compression phase high damping valve 7 is installed on the upper surface of the piston body member 3 and is contacted against the compression phase seat surfaces 3c so as to restrictively allow a fluid flow in the compression phase communication holes. An extension phase high damping valve 8 is installed on the bottom surface of the piston member 3 and is contacted against the extension phase seat surfaces 3d so as to restrictively allow the fluid flow in the extension phase communication holes 3b.

Another compression phase seat surface 4b is projected from an upper surface of the compression phase sub body 4 so as to form a compression phase pressure receiving chamber 4a. Then, a compression phase low damping valve 9 is disposed so as to be contacted against the compression phase seat surface 4b. On the other hand, an extension phase seat surface 5b is projected from a lower surface of the extension phase sub body 5 so as to form an extension phase pressure receiving chamber 5a and an extension phase low damping valve 10 is installed so as to be contacted against the extension phase seat surface 5b.

It is noted that washers 12a, 12b, 12c, 12d and retainers 13a and 13b are disposed so that flexings of the respective damping valves 7, 8, 9, and 10 in their opening directions are allowed but their quantities of flexings are suppressed to their predetermined quantities.

An approximately cylindrical control valve element (adjuster or rotator) 14 is rotatably inserted into a penetrating hole 1e which is penetrated through the piston rod 1 in its axial direction.

Two compression phase communication grooves 14a and 14a are formed axially on an outer peripheral surface of the control valve element 14 so as to be mutually opposed to each other in a radial direction of the control valve element 14 (refer also to FIGS. 4A, 4B, 5A, 5B, 6A, and 6B). First radial hole (port) 1a and second port 1b are radially penetrated through the piston rod 1. As shown in FIG. 1, the first port 1a and second port 1b, the compression phase communication holes 14a, 14a, and the compression phase intermediate pressure receiving chamber 3e form a compression phase one-way fluid passageway II to communicate the fluid flow between the compression phase communication holes 3a and the upper chamber A (compression phase low pressure chamber).

On the other hand, two extension phase communication grooves 14b and 14b are formed axially on the outer peripheral surface of the control valve element 14 so as to be mutually opposed to each other in the radial direction of the control valve element 14 (refer also to FIGS. 4C, 4D, 5C, 5D, 6C, and 6D). Third radial hole (port) 1c and fourth radial hole (port) 1d are radially penetrated through different positions of the piston rod 1 from the first and second ports 1a and 1c. As shown in FIG. 1, the extension phase communication holes 14b and 14b, the third and fourth ports 1c and 1d, and the extension phase intermediate pressure receiving chamber 3f formed on the lower end of the extension phase sub body 5 form an extension phase one-way fluid passageway I to communicate the fluid flow between the extension phase communication hole 3b and the lower chamber B (extension phase low pressure chamber).

Compression phase variable throttle means $R_2$ is formed between the compression phase communication grooves 14a and 14a, the first port 1a, and the second port 1d. Extension phase variable throttle means $R_1$ is formed between the extension phase communication grooves 14d and 14b and the third port 1c, and the fourth port 1d. Thus, when the control valve element 14 is pivoted (rotationally displaced), their throttle opening angles of both throttle means $R_1$ and $R_2$ are varied independently of each other.

The control valve element 14 is linked with a control rod 15 so as to enable input of a driving force from a stepping motor (not shown). The stepping motor is driven to rotate its rotor upon receipt of a rotation command signal from a control unit having a microcomputer, the rotation command signal being generated according to a signal, for example, from a vertical sprung mass acceleration sensor.

A plug 16 used to prevent a drop of the attached elements to the piston rod 1 is fitted into the penetrating hole 1e at a lower side of the control valve element 14.

As described above, in the embodiment shown in FIGS. 1, 2, and 3, two extension phase flow passage D and E are formed; an extension phase main flow passage D constituted by a route such an order as the upper chamber A, the extension phase communication holes 3b, the extension phase intermediate pressure receiving chamber 3f, the valve opened extension phase high damping valve 8, and the lower chamber B; and an extension phase sub flow passage E constituted by the extension phase communication holes 3b, the extension phase fluid one-way passageway I bypassing the extension phase high damping valve 8, the valve opened extension phase low damping valve 10, and the lower chamber B.

Two compression phase flow passages F and G are formed; a compression phase main flow passage F constituted by a route such an order as the lower chamber B, the compression phase communication holes 3a, the compression phase intermediate pressure receiving chamber 3e, the valve opened compression phase high damping valve 7, and the upper chamber A; and a compression phase sub flow passage G constituted by a route such an order as the compression phase communication holes 3a, the compression phase fluid one-way passageway II bypassing the compression phase high damping valve 7, the valve opened compression phase low damping valve 9, and the upper chamber A.

FIGS. 4A, 4B, 4C, 4D, 5A, 5B, 5C, 5D, 6A, 6B, 6C, and 6D show opened or closed states of the variable throttle means $R_1$ and $R_2$ when the control valve element 14 is rotated and displaced at three predetermined damping force characteristic positions (H-S characteristic position, S-S characteristic position, and S-H characteristic position), respectively.

FIGS. 7A, 7B, 7C, 8A, 8B, and 8C show states of the respective flow passages when the control valve element is displaced at the H-S, S-S, and S-H damping characteristic positions.

Figure 9:
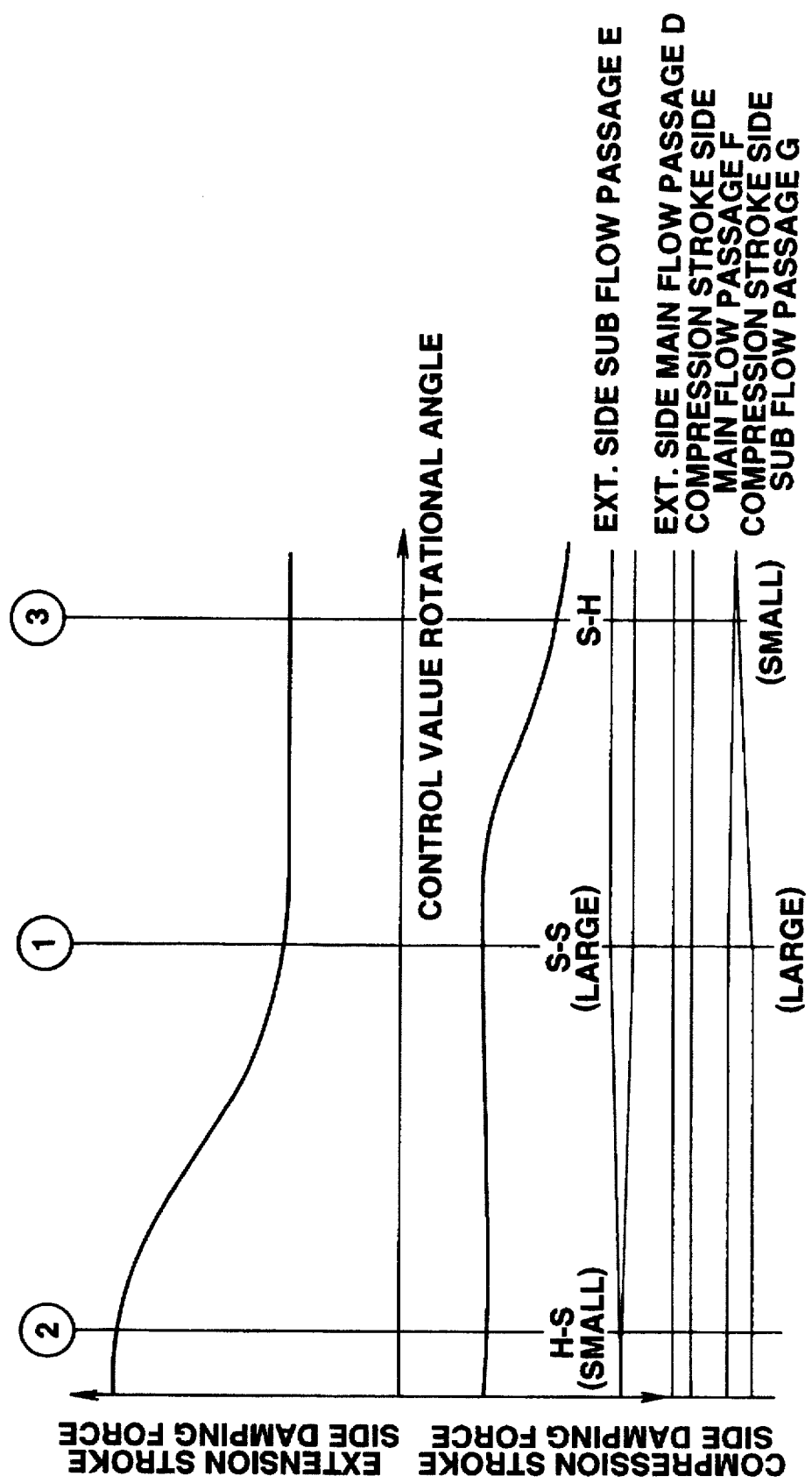
FIG. 9 is a damping force characteristic varying graph in the embodiment shown in FIG. 1 and throttle opening states in each of flow passages.

FIG. 9 shows the damping force characteristic switching graph of the shock absorber SA and open or closed states of the four flow passages E, D, F, and G.

First, when the control valve element 14 has a neutral position (FIGS. 5A through 5D and ① in FIG. 9) at which both of the extension phase variable throttle means $R_1$ and compression phase variable throttle means $R_2$ are open so that all of the extension phase and compression phase flow passages D, E, F, and G can be fluid communicated, as shown in S-S position of FIGS. 7B and 8B. Hence, during the extension (phase) piston stroke, the damping fluid flows through the extension phase sub passage E when the piston P moves at a relatively low speed since the sub passage E has a low fluid flow resistance. As the piston P speed becomes high, the damping fluid flows through the extension phase main flow passage D. Consequently, the damping characteristic at the extension phase stroke indicates a soft damping force characteristic.

In addition, during the compression stroke, the damping fluid flows through the compression phase sub passage G having the low fluid flow resistance when the piston P speed is the relatively low. As the piston speed becomes high, the fluid flows through the compression phase main flow passage F. Consequently, the damping force characteristic at the compression stroke is the relatively soft damping characteristic.

This is called S-S characteristic.

Next, when the control valve element 14 is rotationally displaced from the neutral position to a H-S damping force characteristic position (shown in FIGS. 4A through 4D and ② of FIG. 9), the compression phase variable throttle means $R_2$ is open but the extension phase variable throttle means $R_1$ is closed. As shown in FIGS. 7A and 8A, at this position, only the extension phase main flow passage D, the compression phase main flow passage F and the compression phase sub flow passage G are communicable. Hence, although the damping force characteristic at the compression phase is relatively soft damping force characteristic, the damping force characteristic at the extension phase is relatively hard but that at the compression phase is relatively soft. This is called H-S characteristic.

Next, when the control valve element 14 is rotationally displaced from the neutral position to a S-H characteristic position (S-H characteristic position of FIGS. 6A through 6D and ③ of FIG. 9), the extension phase variable throttle means $R_1$ is, in turn, open and the compression phase variable throttle means $R_2$ is closed. As shown in S-H position of FIGS. 7C and 8C, the fluid can flow only through the compression phase main flow passage F, the extension phase main flow passage D, and the extension phase sub flow passage E. Consequently, the damping force characteristic at the extension phase indicates the relatively soft but that at the compression phase indicates the relatively hard. This is called S-H characteristic.

Furthermore, when the control valve element 14 is rotationally displaced in a counterclockwise direction in order to switch the S-S characteristic position of FIGS. 5A through 5D into the H-S characteristic position of FIGS. 4A through 4D, the throttle opening angle of the extension phase variable throttle means $R_1$ is reduced so that the flow passage cross sectional area in the extension phase sub flow passage E. Thus, with the compression phase left at the soft damping force characteristic, only the damping force characteristic at the extension phase becomes gradually increased (H-S characteristic region).

On the contrary, when the control valve element 14 is rotationally displaced in a clockwise direction in order to switch the S-S characteristic position of FIGS. 5A through 5D into the S-H characteristic position of FIGS. 6A through 6D, the throttle opening angle of the compression phase variable throttle means $R_2$ is reduced so that the flow passage cross sectional area of the compression phase sub flow passage G becomes reduced. Consequently, with the extension phase left in the soft state, the damping force characteristic at the compression phase becomes gradually increased (H-S characteristic region).

As described above, the shock absorber SA in the embodiment shown in FIGS. 1 through 9, an arbitrary switching between the H-S characteristic with the extension phase at the hard damping force characteristic and the compression phase fixed at the soft damping force characteristic, both of the extension and compression phase S-S soft damping characteristics, and the S-H characteristic with the extension phase at soft damping force characteristic and the compression phase fixed at the hard damping force characteristic can be achieved.

Since the extension phase one-way passageway I bypassing the extension phase high damping valve 8 and the compression phase one-way passageway II bypassing the compression phase high damping valve 7 are respectively communicated with the extension phase communication holes 3b and compression phase communication holes 3a and the grooved control valve element 14 forms the extension phase communication grooves 14b and the compression phase communication grooves 14a which are serially-conneted form and grooved in the axial direction of the control valve element 14. Therefore, both of the extension and compression phase one-way fluid flow passageways I and II are formed independently of each other. Thus, so called, both check valves at the extension and compression phases can be omitted and the structure of the shock absorber can be simplified. Especially, since it is not necessary to incorporate the check valve(s) within the interior of the control valve element 14 nor to secure a wide flow passage cross sectional area within the interior of the control valve element 14, the smaller outer diameter of the control valve element 14 can be achieved.

Hence, due to the simplified structure of the shock absorber SA and due to the smaller outer diameter of the control valve element 14, the degree of freedom of tuning the damping force characteristics can be enhanced and the reduction of cost of manufacturing the shock absorber SA becomes possible.

Although, in the embodiment shown in FIGS. 1 through 9, three positions of H-S characteristic position, S—S characteristic position, and S-H characteristic position are provided, the shock absorber SA may take other three positions, i.e., H-S characteristic position, M—M characteristic position, and S-H characteristic position as shown in FIG. 10.

It is noted that the M—M characteristic position means intermediate characteristics between the H-S characteristic position and S-H characteristic position and means that both damping force characteristics at the extension and compression phases are medium characteristics between soft and hard.

It is noted that since the structure of the shock absorber SA becomes simple and the outer diameter of the control valve element is reduced, a hydraulic load torque of the control valve element 14 is decreased, the stepping motor to drive the adjuster (control valve element) can be small-sized, and the reduction of cost of manufacturing the shock absorber SA can be achieved.

It is further noted that since the inner diameter of the piston rod 1 is accordingly reduced, the wall thickness of the piton rod can become thick, the rigidity and strength of the piston rod 1 can be improved.

Various types of embodiments and modifications can be made within the scope of the present invention which will be defined by the appended claims.

What is claimed is:

1. A hydraulic shock absorber having a variable damping force characteristic structure, comprising:

a) an outer cylinder;

b) a hollow rod;

c) a piston which is so constructed and secured on an outer periphery of said hollow rod as to divide an interior of said cylinder into first and second chambers containing damping fluid and as to slidably move axially of said cylinder in accordance with a road condition, said piston having a piston body member along an axial direction of which extension phase fluid communication hole means and compression phase fluid communication hole means are penetrated for communicating fluid flow between said first and second chambers and said piston body member forming at least both of an extension phase intermediate pressure receiving chamber around an outlet of said extension phase fluid communication hole means and of a compression phase intermediate pressure receiving chamber on an outlet of said compression phase fluid communication hole means;

d) first extension phase disc-shaped damping valve means for restrictively allowing the fluid flow into said second chamber via said extension phase fluid communication hole means and extension phase intermediate pressure receiving chamber so as to generate a relatively high damping force thereat;

e) first compression phase disc-shaped damping valve means for restrictively allowing the fluid flow into said first chamber via said compression phase fluid communication hole means and compression phase intermediate pressure receiving chamber so as to generate the relatively high damping force thereat;

f) a control valve element which is rotatably disposed within said hollow rod and having first and second groove means formed on different positions in an axial direction of said control valve element;

g) at least first, second, third, and fourth radial holes penetrated through an outer wall of said hollow rod radially of said hollow rod;

h) second extension phase disc-shaped damping valve means for restrictively allowing the fluid flow into said second chamber via said extension phase fluid communication hole means, extension phase intermediate pressure receiving chamber, first and second radial holes, and first groove means so as to generate a relatively low damping force thereat;

i) second compression phase disc-shaped damping force valve means for restrictively allowing the fluid flow into said first chamber via said compression phase fluid communication hole means, compression phase intermediate pressure receiving chamber, third and fourth radial holes, and second groove means so as to generate the relatively low damping force thereat;

j) an extension phase one-way passageway bypassing said first extension phase disc-shaped damping valve means, being formed of said extension phase fluid communication hole means, first and second radial holes, and first groove means, and having extension phase variable throttle means formed by said first and second radial holes and by said first groove means and whose flow cross sectional area is varied according to a rotationally displaced position of said control valve element; and k) a compression phase one-way passageway bypassing said first compression phase disc-shaped damping valve means, being formed of said compression phase fluid communication hole means, third and fourth radial holes, and second groove means, and having compression phase variable throttle means formed by said third and fourth radial holes and by said second groove means and whose flow cross sectional area is varied according to the rotationally displaced position of said control valve element; and wherein said control valve element is in a shape of a grooved rod extended axially in said hollow rod and has a neutral position at which both extension and compression phase one-way passageways are open, both extension and compression phase throttle means taking their large cross sectional areas, said control valve element being angularly displaceable in a first rotational direction from said neutral position to a first displaced position at which one of the throttle openings of said extension phase throttle means indicates a relatively large cross sectional area one of the throttle openings of said compression phase throttle means indicating a relatively small cross sectional area so as to limit the fluid flow therethrough and being angularly displaceable in a second rotational direction opposite to the first rotational direction from the neutral position to a second displaced position at which the one throttle opening of said extension phase throttle means indicates the relatively small cross sectional area so as to limit the fluid flow therethrough, the one throttle opening of said compression phase throttle means indicating the relatively large cross sectional area.

2. A hydraulic shock absorber having a variable damping force characteristic structure as claimed in claim 1, wherein said first extension phase disc-shaped damping valve means comprises a plurality of disc-shaped plates secured onto the side wall of said hollow rod and overlapped on one another, a radial surface of said disc-shaped plates defining said extension phase intermediate pressure receiving chamber with said piston body member, said piston body member having a first diametrical land contacted against an end of said radial surface of disc-shaped plates and said first compression phase disc-shaped damping valve means comprises the plurality of disc-shaped plates secured onto the side wall of said hollow rod and overlapped on one another, the radial surface of said disc-shaped plates defining said compression phase intermediate pressure receiving chamber with said piston body member, said piston body member having a second diametrical land contacted against an end of said radial surface of disc-shaped plates constituting the first compression phase disc-shaped damping valve means.

3. A hydraulic shock absorber having a variable damping force characteristic structure as claimed in claim 2, which further comprises: an extension phase piston sub body secured on the side wall of said hollow rod and interposed between said disc-shaped plates of said first extension phase disc-shaped damping valve means and said second extension phase damping valve means, said extension phase piston sub body having a second diametrical land; and a compression phase piston sub body secured on the side wall of said hollow rod and interposed between said disc-shaped plates of said first compression phase disc-shaped damping valve means and said second compression phase damping valve means, said compression phase piston sub body having the second diametrical land, and wherein said second extension phase disc-shaped damping valve means comprises a single disc-shaped plate having a radial surface contacted against the second diametrical land of said extension phase piston sub body and said second compression phase disc-shaped damping valve means comprises the single disc-shaped plate having the radial surface contacted against the second diametrical land of said compression phase piston sub body.

4. A hydraulic shock absorber having a variable damping force characteristic structure as claimed in claim 3, wherein said extension phase throttle means comprises: an inner outlet of the first radial hole together with a first part of an outer peripheral surface of said grooved control rod; and an inner outlet of said second radial hole together with a second part of the outer peripheral surface of said grooved control rod and said compression phase throttle means comprises: an inner outlet of the third radial hole together with a third part of an outer peripheral surface of said grooved control rod; and an inner outlet of said fourth radial hole together with a fourth part of the outer peripheral surface of said grooved control rod.

5. A hydraulic shock absorber having a variable damping force characteristic structure as claimed in claim 4, wherein said extension phase fluid communication hole means is in the shape of an ellipse in a radially cross section of said piston body member, said extension phase fluid communication hole means comprising four holes radially disposed in said piston body member and being symmetrical with one another and said compression phase fluid communication hole means is in the shape of an ellipse in the radially cross section of said piston body member, said compression phase fluid communication hole means comprising four holes radially disposed in said piston body member so as to be adjacent to each of said four holes of said extension phase fluid communication hole means and being symmetrical with one another.

6. A hydraulic shock absorber having a variable damping force characteristic structure as claimed in claim 5, wherein each of said first, second, third, and fourth radial holes comprises two ports so that extension and compression one-way fluid passageways are two passageways mutually opposed to each other, respectively, in the piston body member.

7. A hydraulic shock absorber having a variable damping force characteristic structure as claimed in claim 6, which further comprises retaining means for tightening said first and second extension and compression phase disc-shaped damping valve means so that flexing quantities of the first and second extension phase and compression phase disc-shaped damping valve means are suppressed to their predetermined flexing quantities, piston body member, and said extension and compression piston sub bodies onto said side wall of the hollow rod.

8. A hydraulic shock absorber having a variable damping force characteristic structure as claimed in claim 1, wherein when said grooved control valve element is rotatably displaced at the neutral position, the damping fore characteristics in the extension and compression phases are relatively soft.

9. A hydraulic shock absorber having a variable damping force characteristic structure as claimed in claim 1, wherein when said grooved control valve element is rotatably displaced at the neutral position, the damping fore characteristics in the extension and compression phases are relatively medium between the relatively soft and relatively hard.

10. A hydraulic shock absorber having a variable damping force characteristic structure as claimed in claim 1, wherein said first extension phase disc-shaped damping valve means provides an extension phase one-way flow passage via said extension phase fluid communication hole means and said extension phase intermediate pressure receiving chamber, the extension phase one-way flow passage being branched from said extension phase one-way passageway, and wherein said first compression phase disc-shaped damping valve means provides a compression phase one-way flow passage via said compression phase fluid communication hole means and said compression phase intermediate pressure receiving chamber, the compression phase one-way flow passage being branched from said compression phase one-way passageway,

* * * * *